(12) United States Patent
Calmeise et al.

(10) Patent No.: US 7,014,200 B2
(45) Date of Patent: Mar. 21, 2006

(54) UTILITY CART

(75) Inventors: Randall W. Calmeise, Akron, OH (US); Doug S. Hardesty, Barberton, OH (US)

(73) Assignee: Akro-Mils, a division of Myers Industries, Inc., Akron, OH (US)

( * ) Notice: Subject to any disclaimer, the term of this patent is extended or adjusted under 35 U.S.C. 154(b) by 0 days.

(21) Appl. No.: 10/852,802

(22) Filed: May 25, 2004

(65) Prior Publication Data

US 2004/0212162 A1    Oct. 28, 2004

Related U.S. Application Data

(63) Continuation of application No. 10/316,290, filed on Dec. 11, 2002, now Pat. No. 6,739,605, which is a continuation of application No. 10/095,880, filed on Mar. 12, 2002, now Pat. No. 6,572,123, which is a continuation of application No. 09/865,144, filed on May 24, 2001, now abandoned, which is a continuation of application No. 09/245,620, filed on Feb. 5, 1999, now abandoned.

(51) Int. Cl.
  *B62B 3/00*    (2006.01)
(52) U.S. Cl. .................. 280/47.35; 280/47.19
(58) Field of Classification Search ............. 280/47.19, 280/47.35, 33.991, 33.997, 47.34, 79.11, 280/79.3; 108/147.16, 157.16, 157.18, 158.12; 403/DIG. 11; 312/108, 263, 265.2, 265.5, 312/351.11
See application file for complete search history.

(56) References Cited

U.S. PATENT DOCUMENTS

| | | | |
|---|---|---|---|
| 596,975 A | 1/1898 | Bent | |
| 721,404 A * | 2/1903 | Wege | 108/147.16 |
| 795,957 A * | 8/1905 | Cartland | 312/265.1 |
| 1,466,039 A | 8/1923 | Burcsak | |
| 1,560,288 A | 11/1925 | Murvay | |
| 2,358,174 A | 9/1944 | McFall | |
| 2,366,676 A * | 1/1945 | Rosenthal | 108/180 |
| 2,539,781 A | 1/1951 | Heaney | |
| 2,688,493 A | 9/1954 | Rosenberg | |
| 2,830,825 A | 4/1958 | Webber et al. | |
| 2,879,072 A | 3/1959 | Rear et al. | |
| 3,436,092 A | 4/1969 | Werner | |
| 4,082,389 A * | 4/1978 | Stewart | 312/258 |
| 4,213,649 A | 7/1980 | Sell | |

(Continued)

FOREIGN PATENT DOCUMENTS

GB    7244    3/1909

(Continued)

*Primary Examiner*—Christopher P. Ellis
*Assistant Examiner*—Christopher Bottorff
(74) *Attorney, Agent, or Firm*—Hahn Loeser & Parks LLP; Michael H. Minns

(57) ABSTRACT

A utility cart which is capable of being readily converted from a first configuration as a conventional utility cart with the area above a bottom table being open into a second configuration as a bin cart, including a number of outwardly extending storage bins. In addition, the utility cart in accordance with the present invention includes end members having "I" beam type construction, the top table and the bottom table have panel members which pivot from an upright position to form a recessed top table and/or a recessed bottom table to a downward position to form a substantially flat top table and/or a substantially flat bottom table and a handle having an organizer integrally built therein, including a beverage container holder, a storage tray and one or more storage compartments.

2 Claims, 21 Drawing Sheets

U.S. PATENT DOCUMENTS

| | | | |
|---|---|---|---|
| 4,300,783 A | | 11/1981 | Fisher |
| 4,430,947 A | * | 2/1984 | Kvame ................. 108/180 |
| 4,446,796 A | | 5/1984 | Wilson et al. |
| 4,568,050 A | * | 2/1986 | Radoy et al. .......... 248/223.41 |
| D285,853 S | | 9/1986 | Hubert |
| 4,763,907 A | | 8/1988 | Raymond |
| 4,856,810 A | | 8/1989 | Smith |
| 4,887,836 A | | 12/1989 | Simjian |
| 4,964,650 A | | 10/1990 | Dickinson |
| 5,016,948 A | | 5/1991 | Welch et al. |
| 5,078,414 A | | 1/1992 | Court et al. |
| 5,083,805 A | * | 1/1992 | Monch et al. ............ 280/47.35 |
| 5,096,152 A | | 3/1992 | Christiansen et al. |
| 5,269,545 A | | 12/1993 | Huebschen et al. |
| 5,290,058 A | | 3/1994 | Adams et al. |
| 5,294,196 A | * | 3/1994 | Chen ..................... 312/263 |
| 5,306,029 A | | 4/1994 | Kaiser, II |
| 5,318,315 A | * | 6/1994 | White et al. ............ 280/47.26 |
| 5,344,225 A | | 9/1994 | Blyth |
| 5,346,297 A | * | 9/1994 | Colson et al. ............ 312/215 |
| 5,362,077 A | | 11/1994 | Adamson |
| 5,368,380 A | * | 11/1994 | Mottmiller et al. ........ 312/263 |
| D353,285 S | * | 12/1994 | Spirk et al. ................. D6/467 |
| 5,372,415 A | * | 12/1994 | Tisbo et al. ................ 312/108 |
| D361,188 S | | 8/1995 | Perelli |
| D361,418 S | | 8/1995 | Smith |
| 5,566,961 A | * | 10/1996 | Snell et al. ............ 280/47.35 |
| D377,127 S | | 1/1997 | Barrington |
| 5,628,441 A | | 5/1997 | Dykstra |
| 5,642,843 A | | 7/1997 | Leivan |
| 5,653,458 A | | 8/1997 | Chaparian |
| 5,664,853 A | * | 9/1997 | Nickolaus, Jr. ........ 312/249.12 |
| 5,762,213 A | * | 6/1998 | Heneveld, Sr. ............. 211/187 |
| D400,334 S | | 10/1998 | Hawkins |
| D406,431 S | | 3/1999 | Tisbo et al. |
| 5,887,878 A | | 3/1999 | Tisbo et al. |
| D408,953 S | * | 4/1999 | Golichowski et al. ....... D34/21 |
| 5,988,552 A | | 11/1999 | Tisbo et al. |
| 6,079,719 A | * | 6/2000 | Tisbo et al. ............ 280/47.35 |
| 6,086,073 A | * | 7/2000 | Tisbo et al. ............ 280/47.26 |
| 6,126,022 A | * | 10/2000 | Merkel ..................... 211/135 |
| 6,129,366 A | | 10/2000 | Dettmann et al. |
| 6,135,583 A | * | 10/2000 | Simon et al. ............ 312/257.1 |
| 6,213,483 B1 | | 4/2001 | Gaffney |
| 6,572,123 B1 | | 6/2003 | Calmeise et al. |

FOREIGN PATENT DOCUMENTS

| | | |
|---|---|---|
| GB | 2182846 | 5/1987 |

\* cited by examiner

UTILITY CART

This application is a continuation of application Ser. No. 10/316,290, filed Dec. 11, 2002, now U.S. Pat. No. 6,739,605, which was a continuation of application Ser. No. 10/095,880, filed Mar. 12, 2002, now U.S. Pat. No. 6,572,123, which was a continuation of application Ser. No. 09/865,144, filed May 24, 2001, now abandoned, which was a continuation of application Ser. No. 09/245,620, filed Feb. 5, 1999, now abandoned. The disclosures of application Ser. Nos. 10/316,290, 10/095,880, 09/865,144 and 09/245,620 are hereby incorporated by reference.

BACKGROUND AND SUMMARY OF THE INVENTION

The present invention relates generally to new and novel improvements in a utility cart. More particularly, the present invention relates to a utility cart which is capable of being readily converted from a first configuration as a conventional utility cart with the area above the bottom table being open into a second configuration as a bin cart, including a number of outwardly extending storage bins.

Various types of known prior art utility carts are currently available to support, move and store various items. However, many known prior art utility carts have drawbacks which limit their functionality and use. For example, most of the known prior art utility carts are fabricated from steel and include a top table, a bottom table and four corner support columns, although some known prior art utility carts are fabricated from a polymeric material, such as plastic. Such known prior art utility carts generally have a fixed configuration and are not capable of being readily modified.

In one aspect of the present invention, this is accomplished by providing a utility cart comprising: vertical support members; two vertically spaced apart tables having a top surface, two sides and two ends, the ends being connected to the vertical support members; a moveable side panel positioned along each side of each table, each movable side panel having an upper surface, each moveable side panel being movable between a first upright position to form a recessed table and a second downward position to form a substantially flat table such that each movable side panel is flush with an adjacent table top surface, each side panel moveably engaging the vertical support members.

Other advantages and novel features of the present invention will become apparent in the following detailed description of the invention when considered in conjunction with the accompanying drawings.

DETAILED DESCRIPTION

Figure 1:
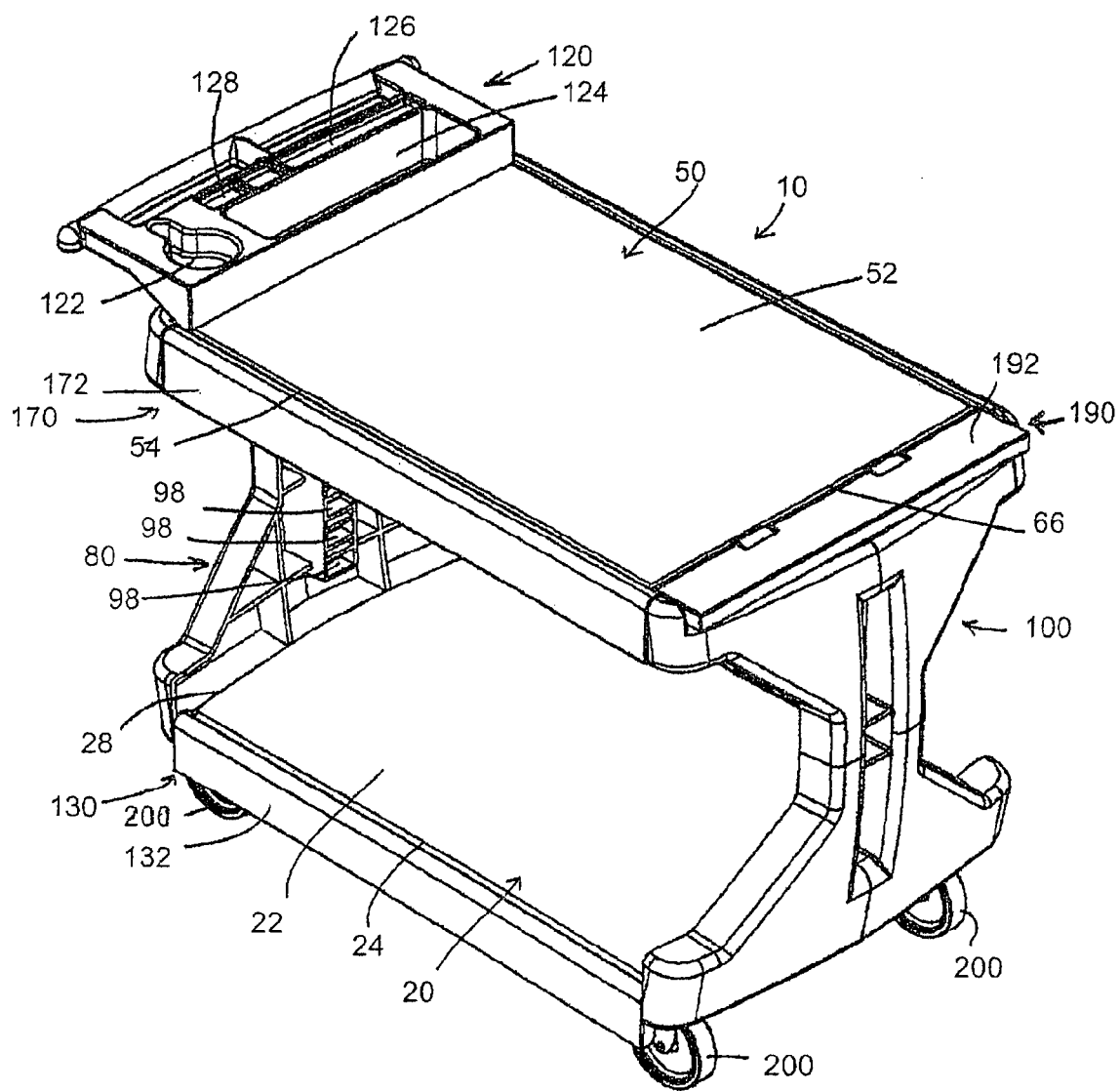
FIG. 1 is a first perspective view of a utility cart in accordance with a preferred embodiment of the present invention in a first configuration as a conventional utility cart with the area above the bottom table being open and panel members on the top table and the bottom table being in their downward positions to form a substantially flat top table and a substantially flat bottom table.
Figure 2:
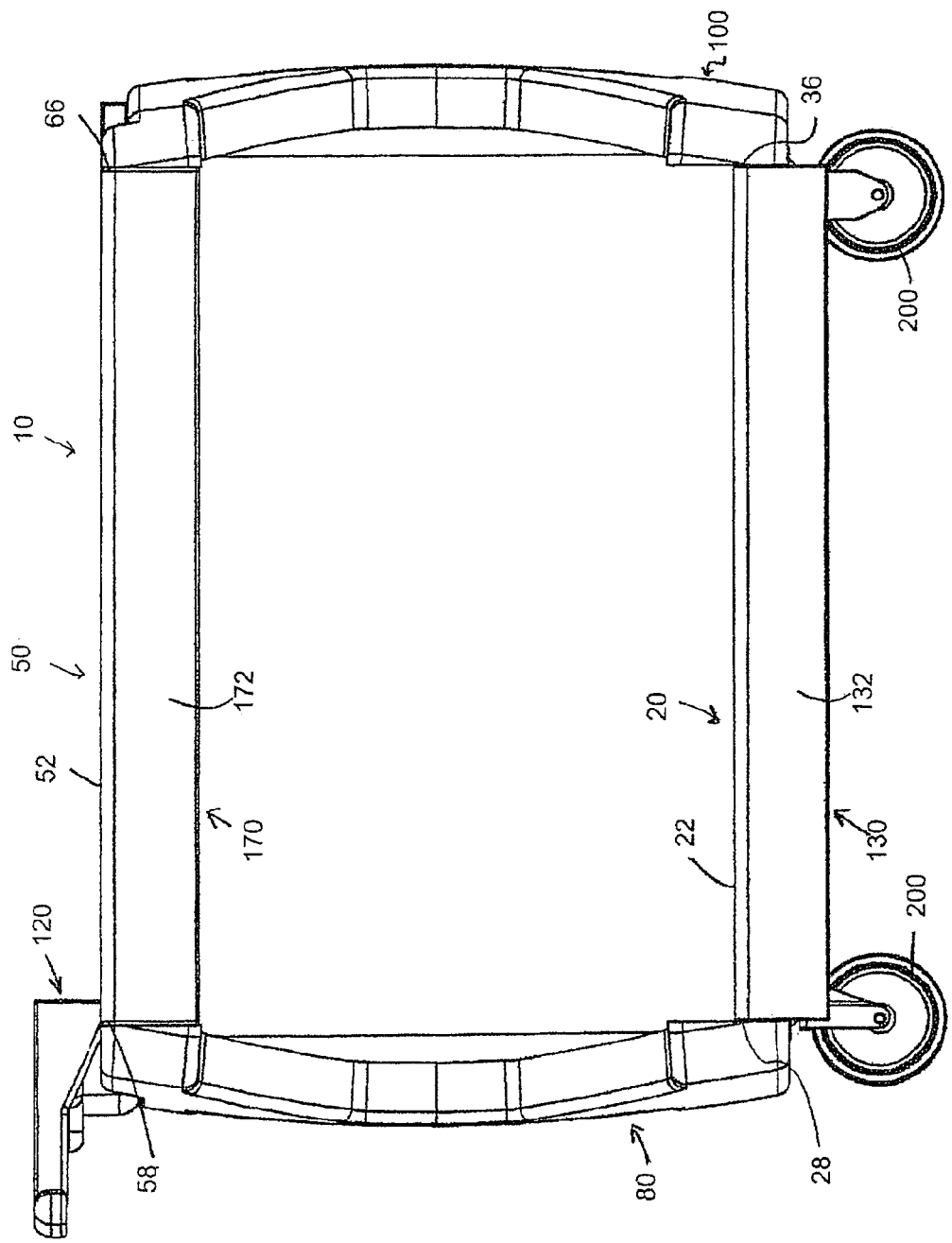
FIG. 2 is a first side elevational view of the utility cart in accordance with the preferred embodiment of the present invention shown in FIG. 1 with the panel members on the top table and the bottom table being in their downward positions to form a substantially flat top table and a substantially flat bottom table.
Figure 3:
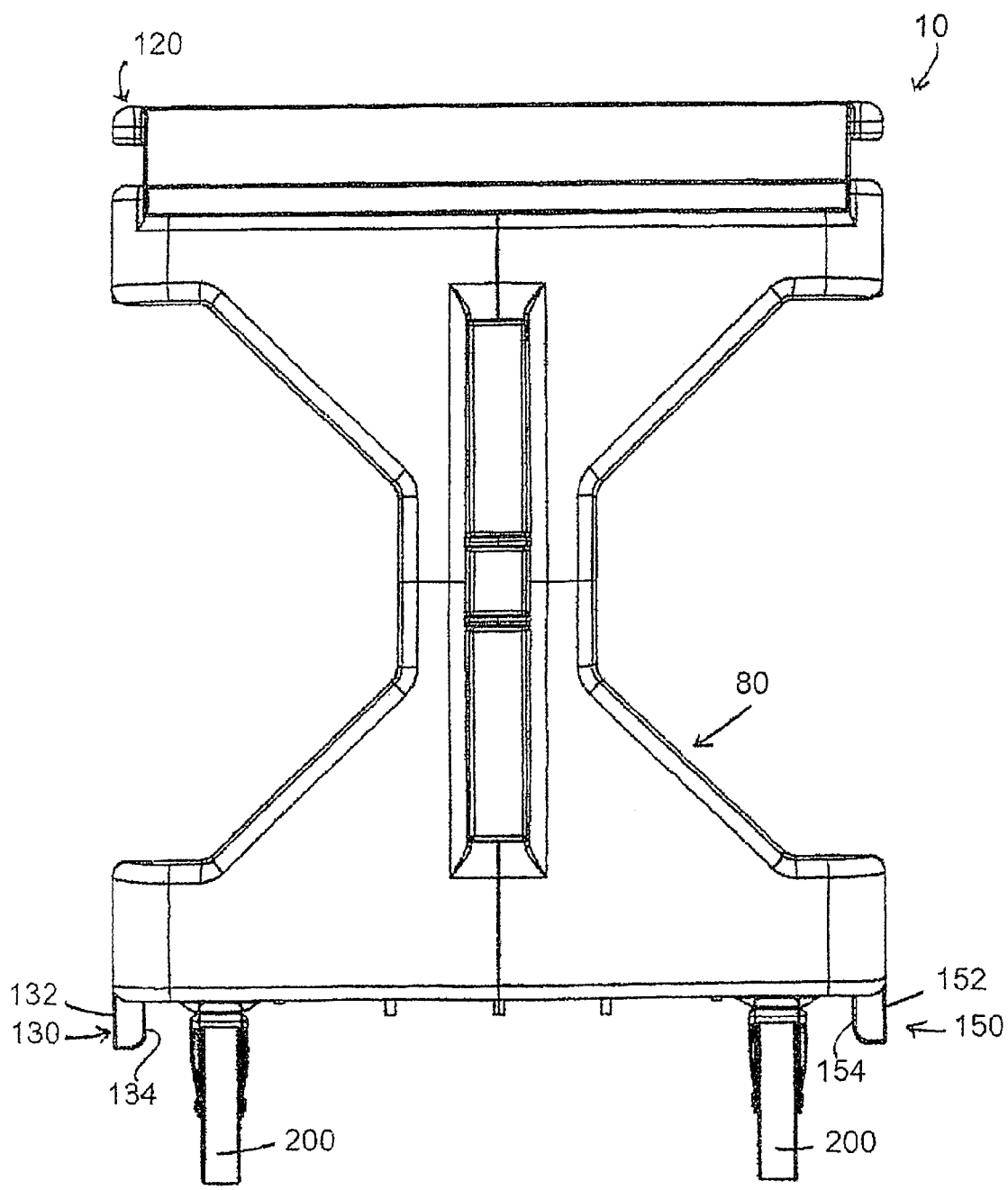
FIG. 3 is a first front elevational view of the utility cart in accordance with the preferred embodiment of the present invention shown in FIG. 1 with the panel members on the top table and the bottom table being in their downward positions to form a substantially flat top table surface and a substantially flat bottom table surface.
Figure 4:
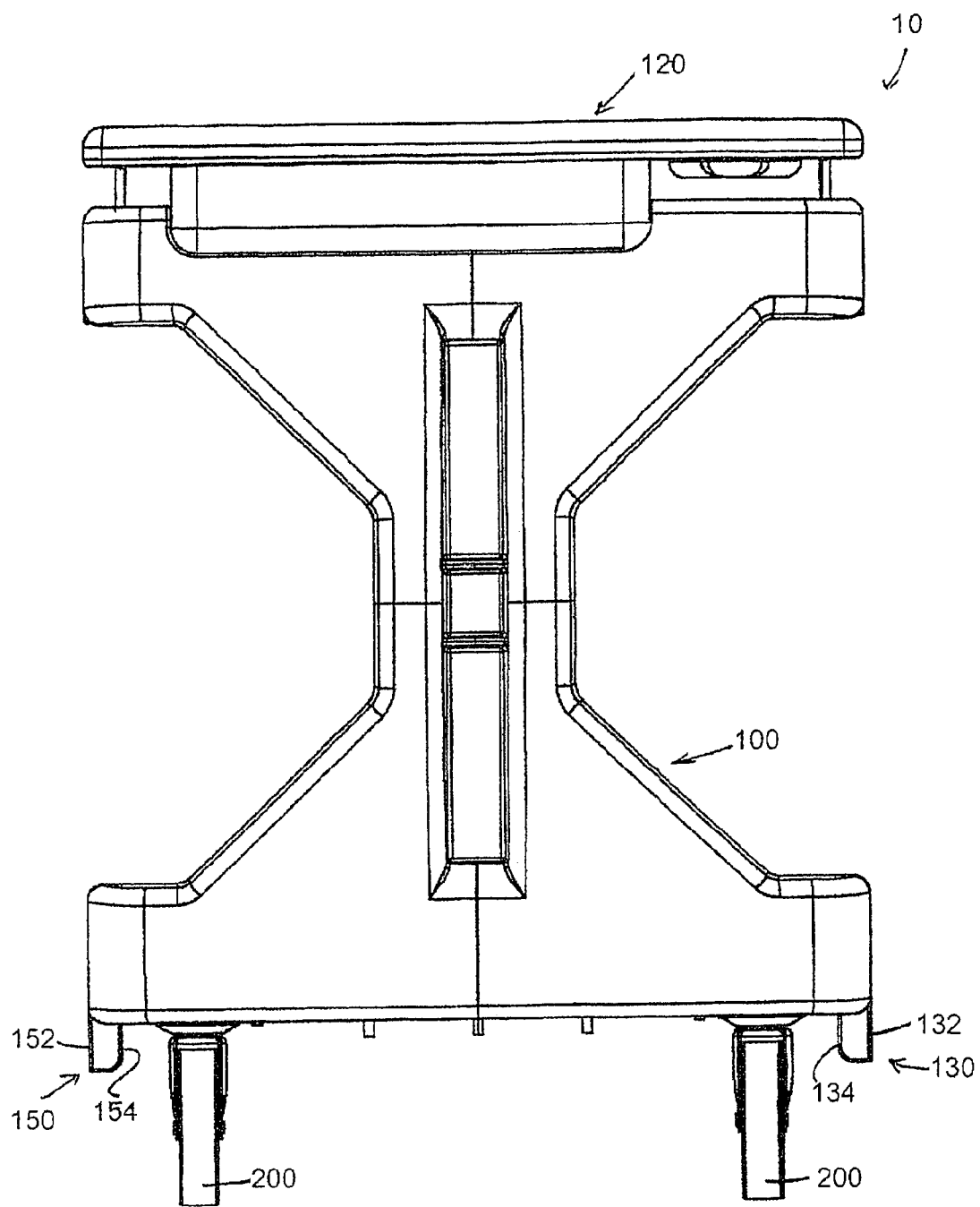
FIG. 4 is a first rear elevational view of the utility cart in accordance with the preferred embodiment of the present invention shown in FIG. 1 with the panel members on the top table and the bottom table being in their downward positions to form a substantially flat top table surface and a substantially flat bottom table surface.
Figure 5:
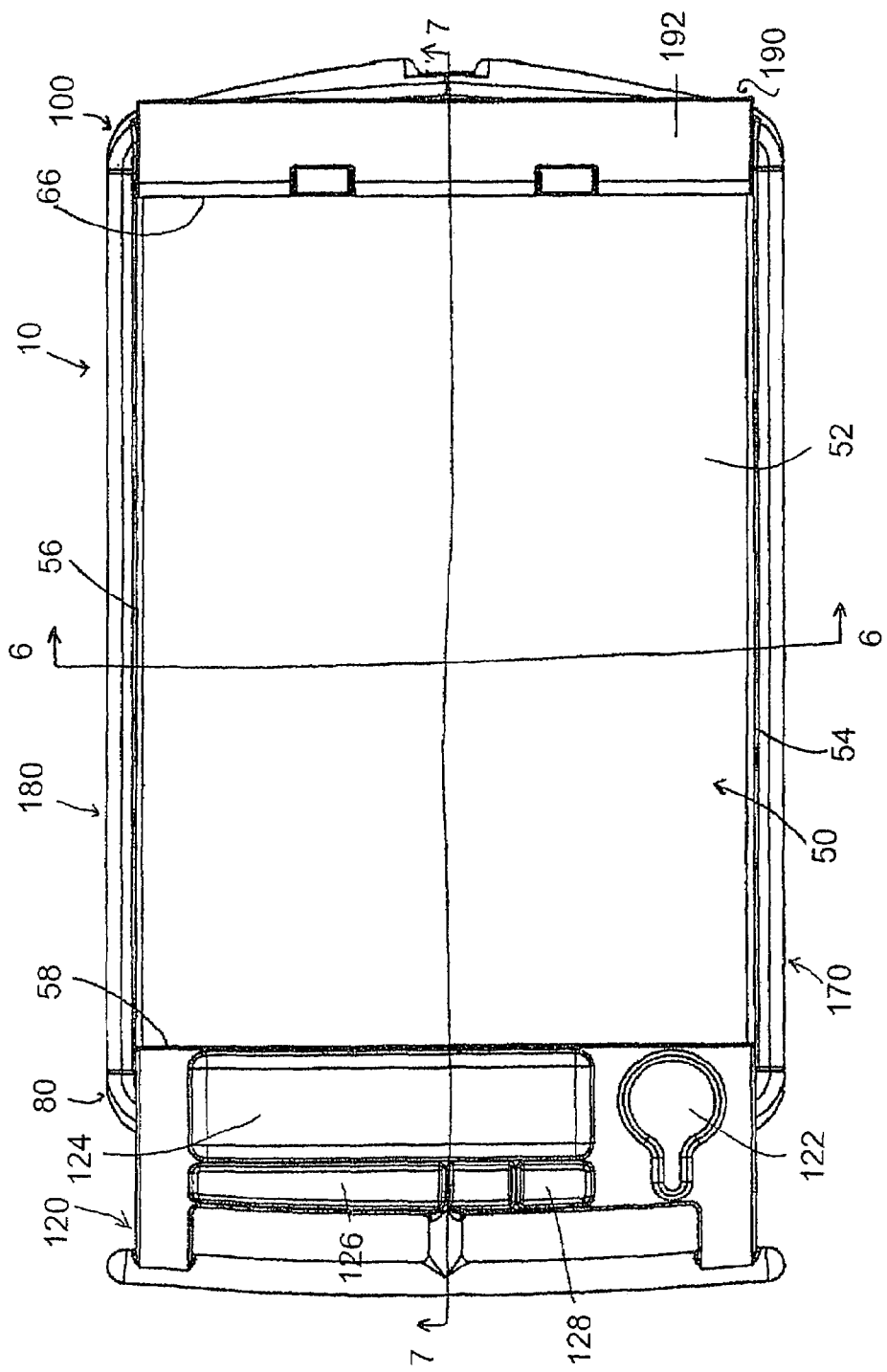
FIG. 5 is a first top plan view of the utility cart in accordance with the preferred embodiment of the present invention shown in FIG. 1 with the panel members on the top table being in their downward positions to form a substantially flat top table surface.
Figure 6:
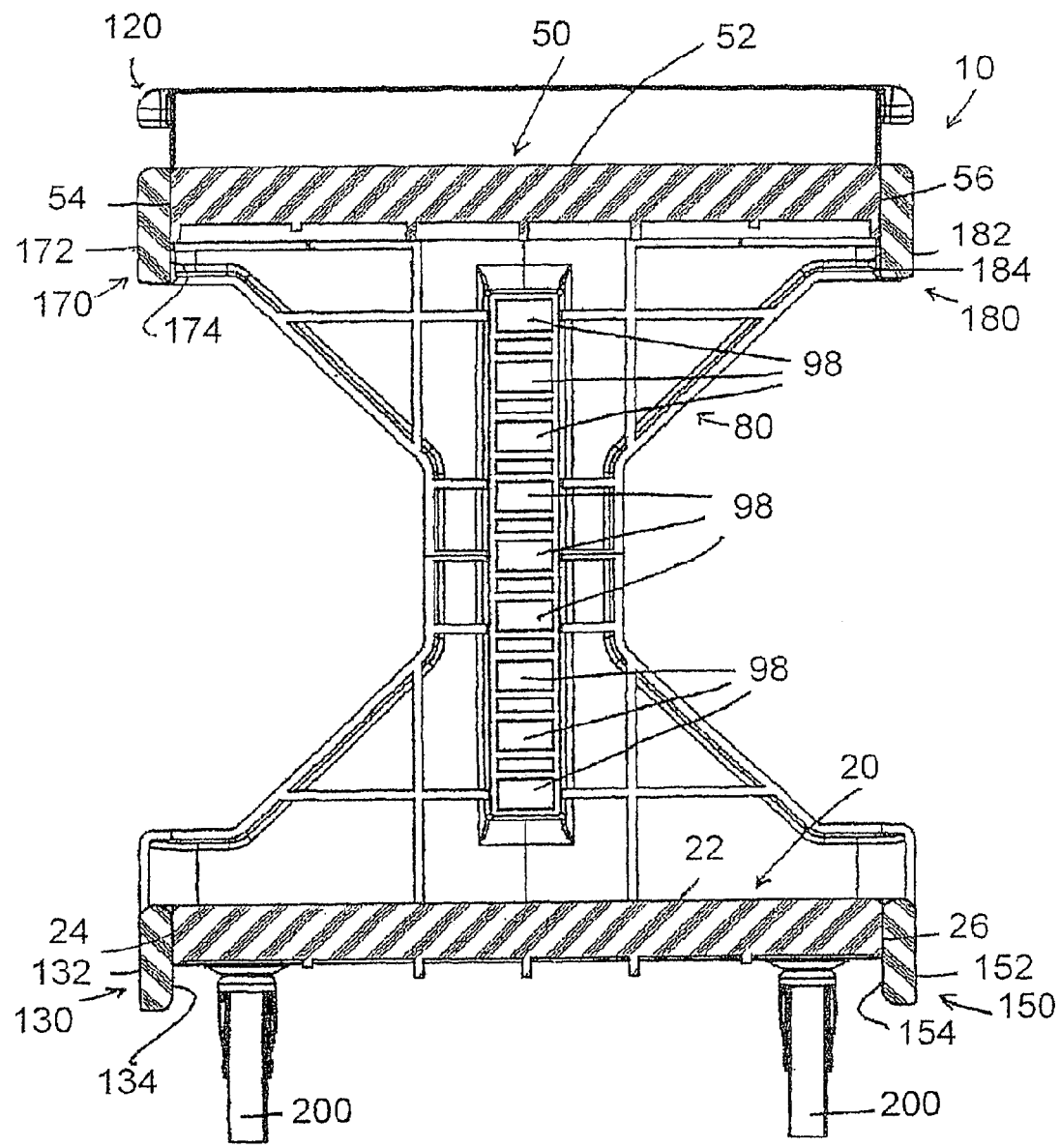
FIG. 6 is a first cross-sectional view of the utility cart in accordance with the preferred embodiment of the present invention shown in FIG. 1 with the panel members on the top table and the bottom table being in their downward positions to form a substantially flat top table surface and a substantially flat bottom table surface taken across line 6—6 in FIG. 5.
Figure 7:
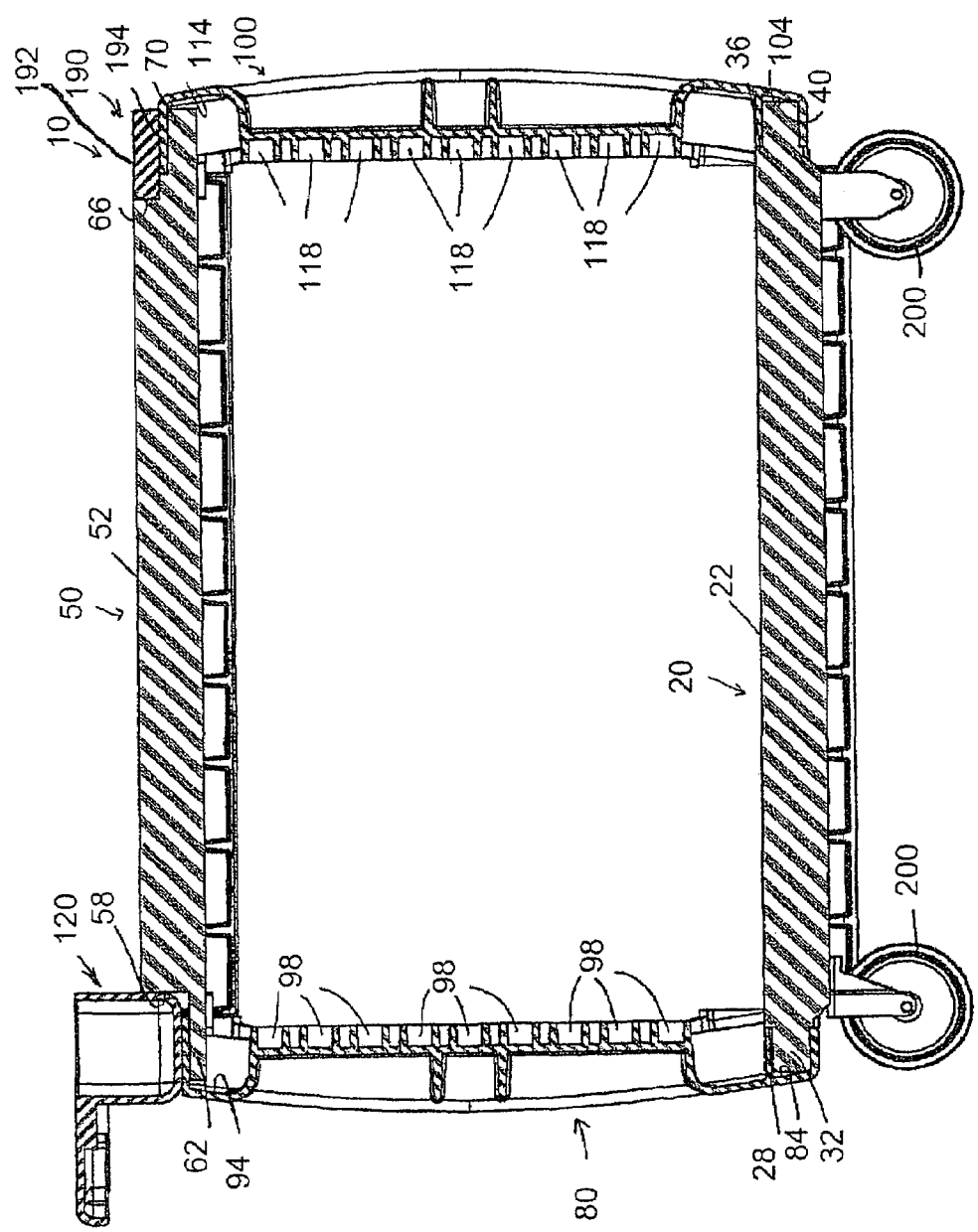
FIG. 7 is a second cross-sectional view of the utility cart in accordance with the preferred embodiment of the present invention shown in FIG. 1 with the panel members on the top table being in their downward positions to form a substantially flat top table surface taken across line 7—7 in FIG. 5.
Figure 8:
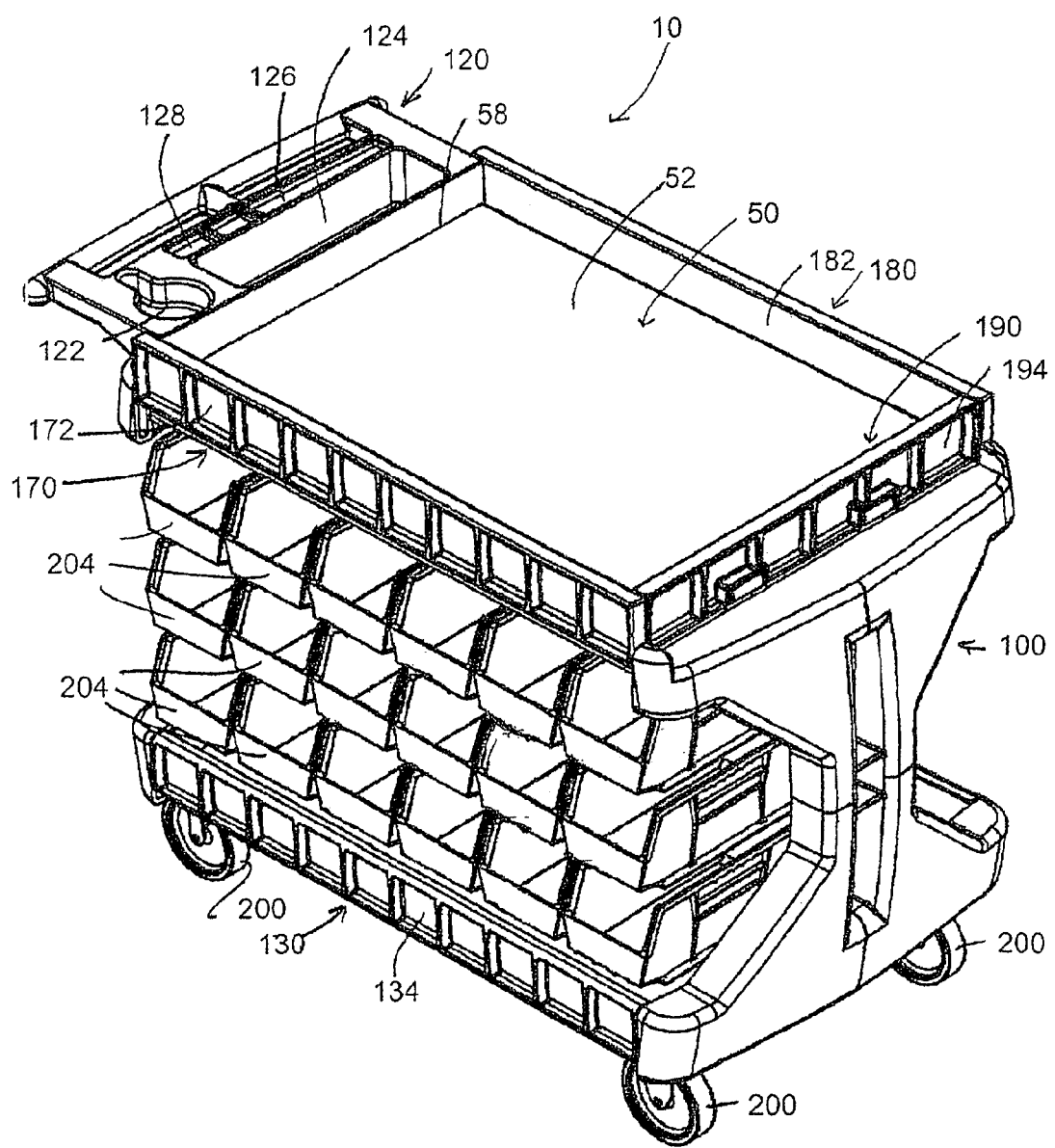
FIG. 8 is a second perspective view of the utility cart in accordance with the preferred embodiment of the present invention shown in FIG. 1 in a second configuration as a bin cart, including a number of storage bins outwardly extending from one side of the utility cart, and with the panel members on the top table and the bottom table being in their upward positions to form a recessed top table and a recessed bottom table.
Figure 9:
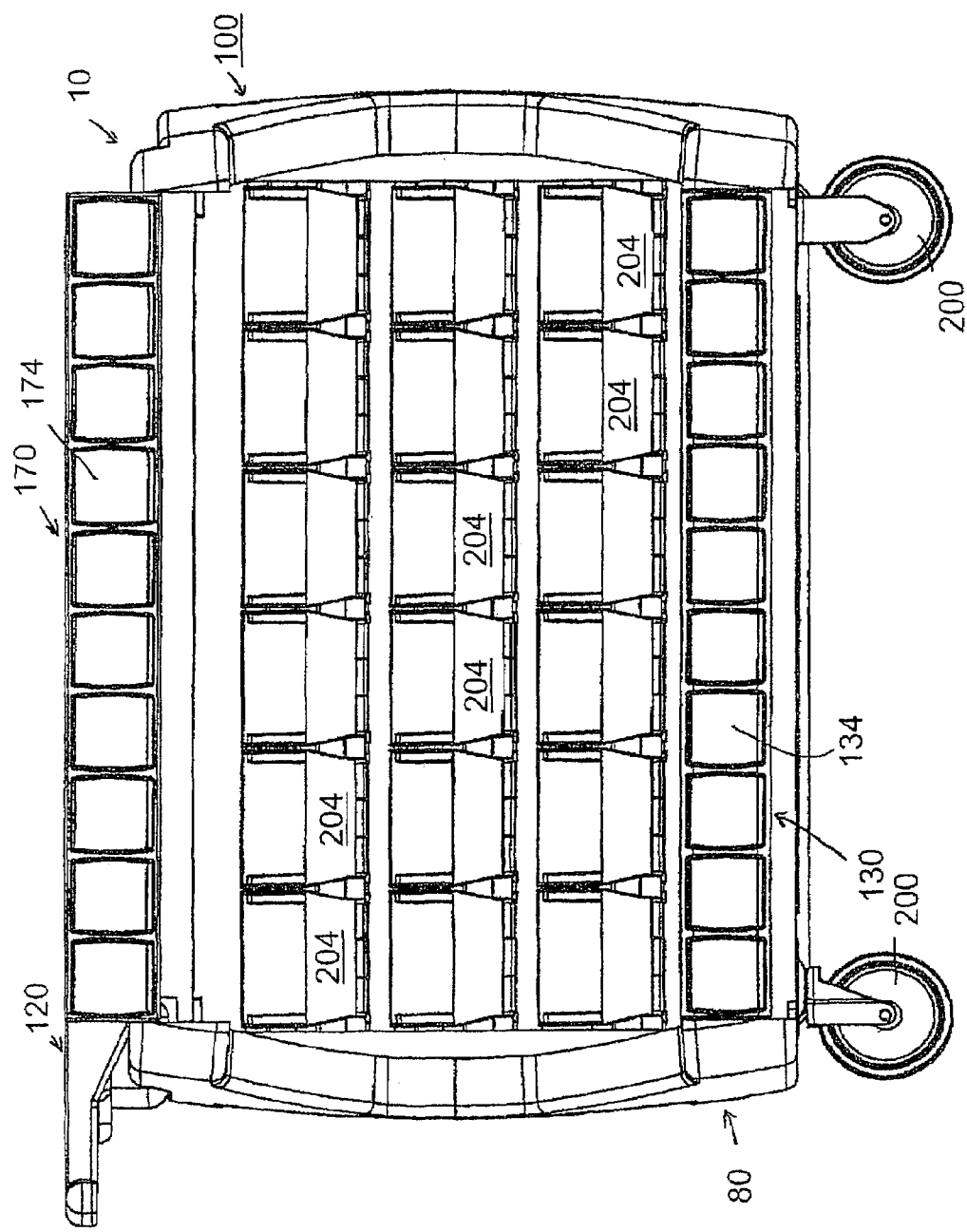
FIG. 9 is a second side elevational view of the utility cart in accordance with the preferred embodiment of the present invention shown in FIG. 1 in a second configuration as a bin cart, including a number of storage bins outwardly extending from one side of the utility cart, and with the panel members on the top table and the bottom table being in their upward positions to form a recessed top table and a recessed bottom table.
Figure 10:
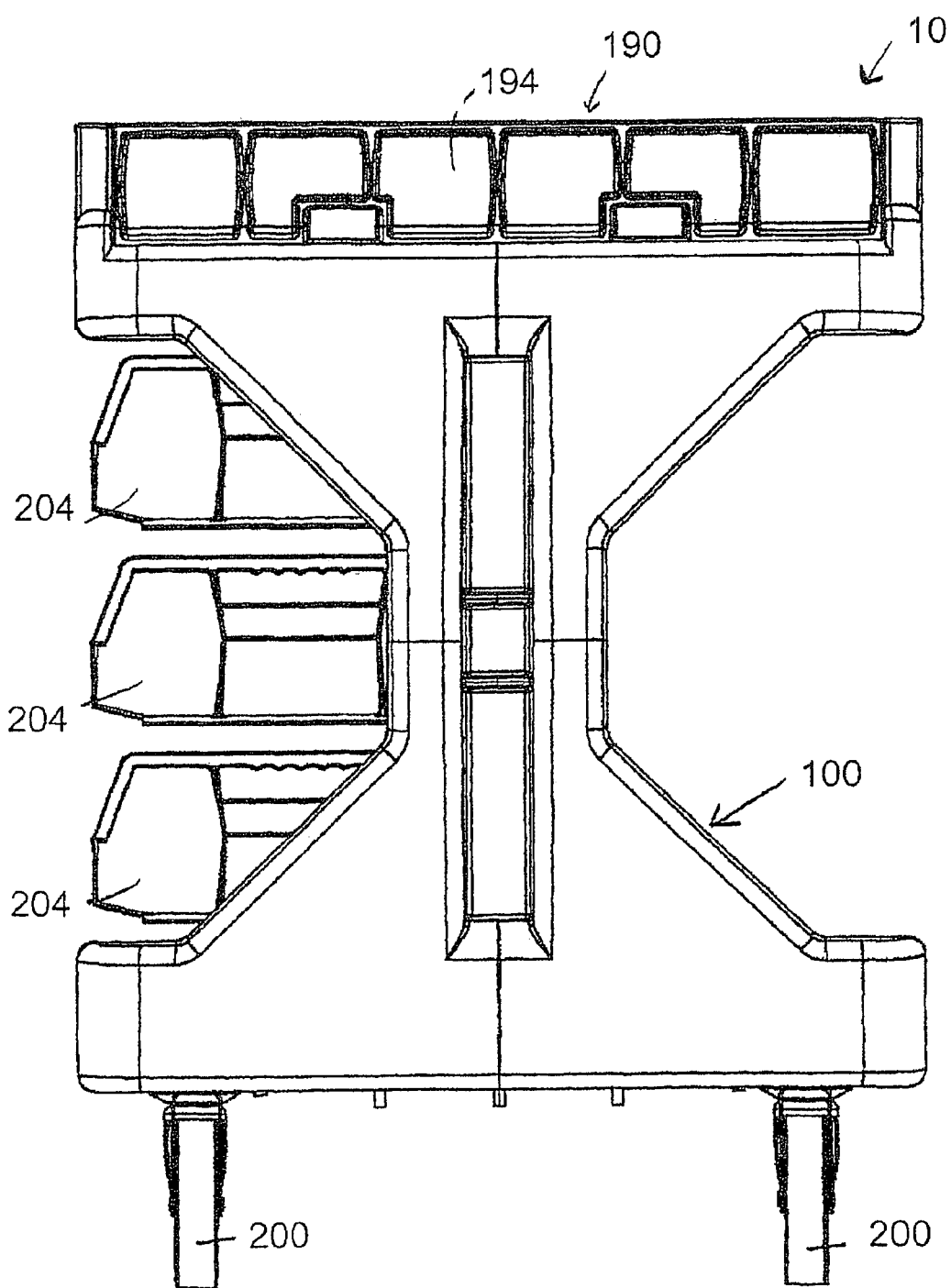
FIG. 10 is a second front elevational view of the utility cart in accordance with the preferred embodiment of the present invention shown in FIG. 1 in a second configuration as a bin cart, including a number of storage bins outwardly extending from one side of the utility cart, and with the panel members on the top table and the bottom table being in their upward positions to form a recessed top table and a recessed bottom table.
Figure 11:
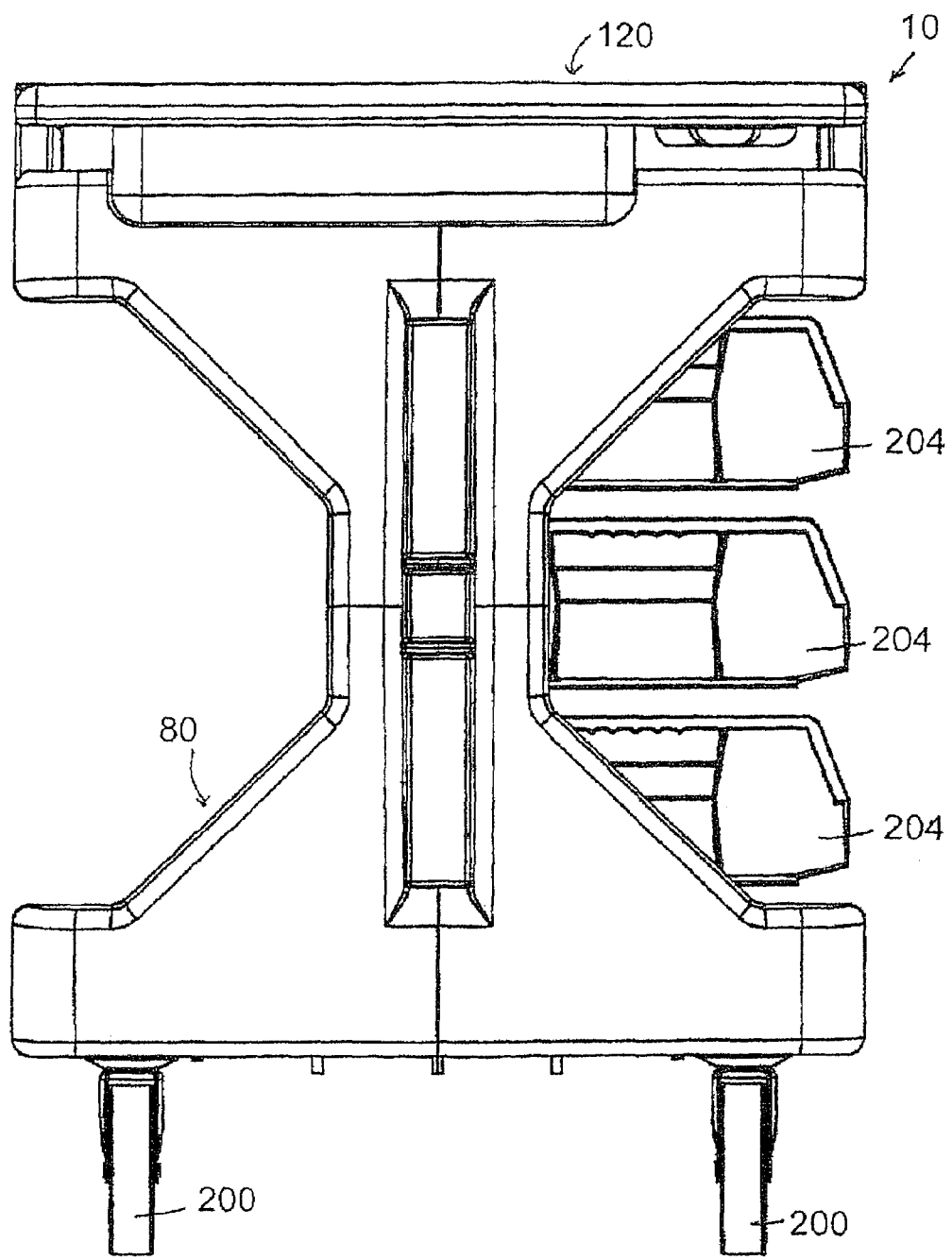
FIG. 11 is a second rear elevational view of the utility cart in accordance with the preferred embodiment of the present invention shown in FIG. 1 in a second configuration as a bin cart, including a number of storage bins outwardly extending from one side of the utility cart, and with the panel members on the top table and the bottom table being in their upward positions to form a recessed top table and a recessed bottom table.
Figure 12:
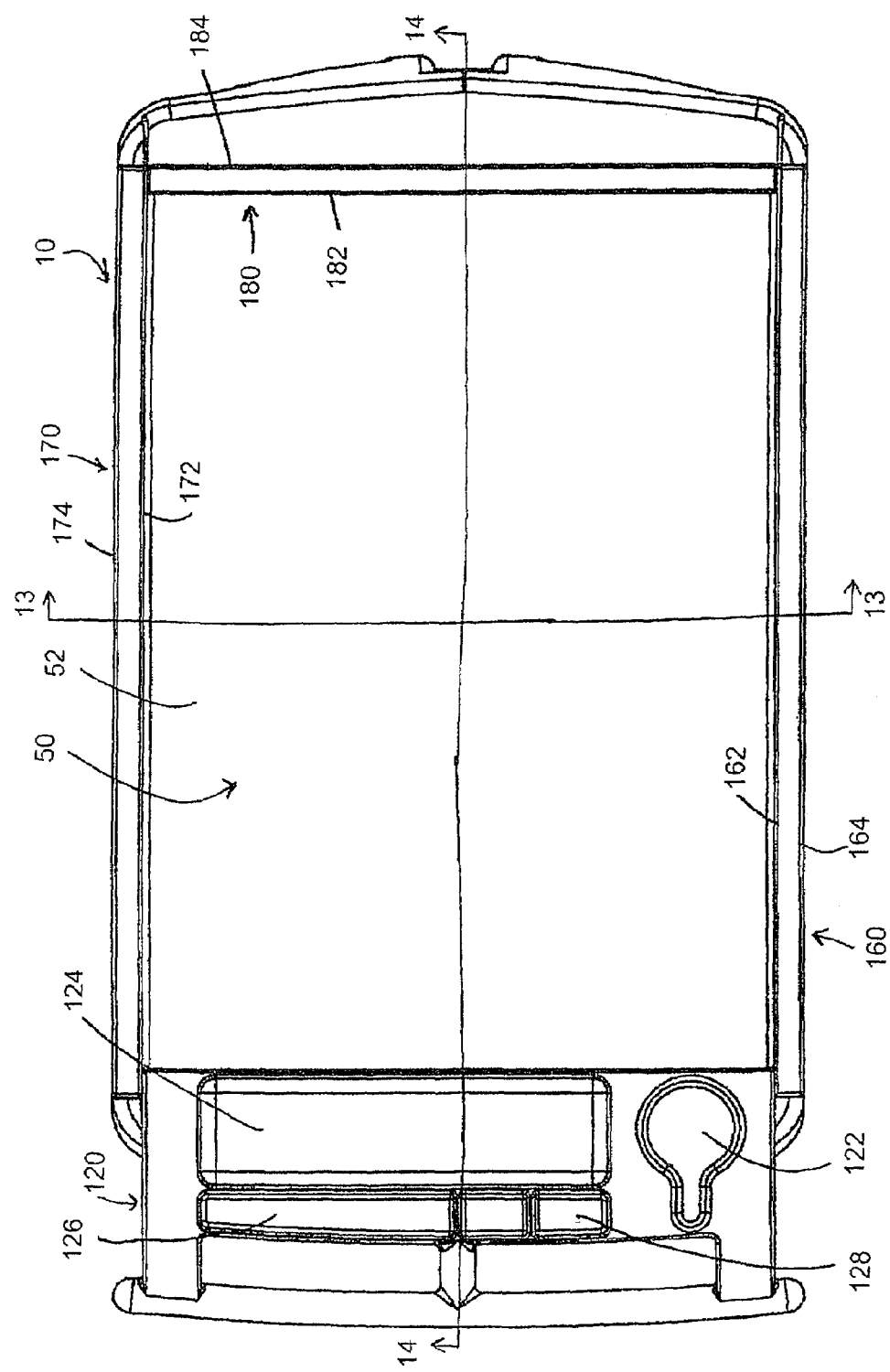
FIG. 12 is a second top plan view of the utility cart in accordance with the preferred embodiment of the present invention shown in FIG. 1 in a second configuration as a bin cart, including a number of storage bins outwardly extending from one side of the utility cart, and with the panel members on the top table being in their downward positions to form a substantially flat top table surface.
Figure 13:
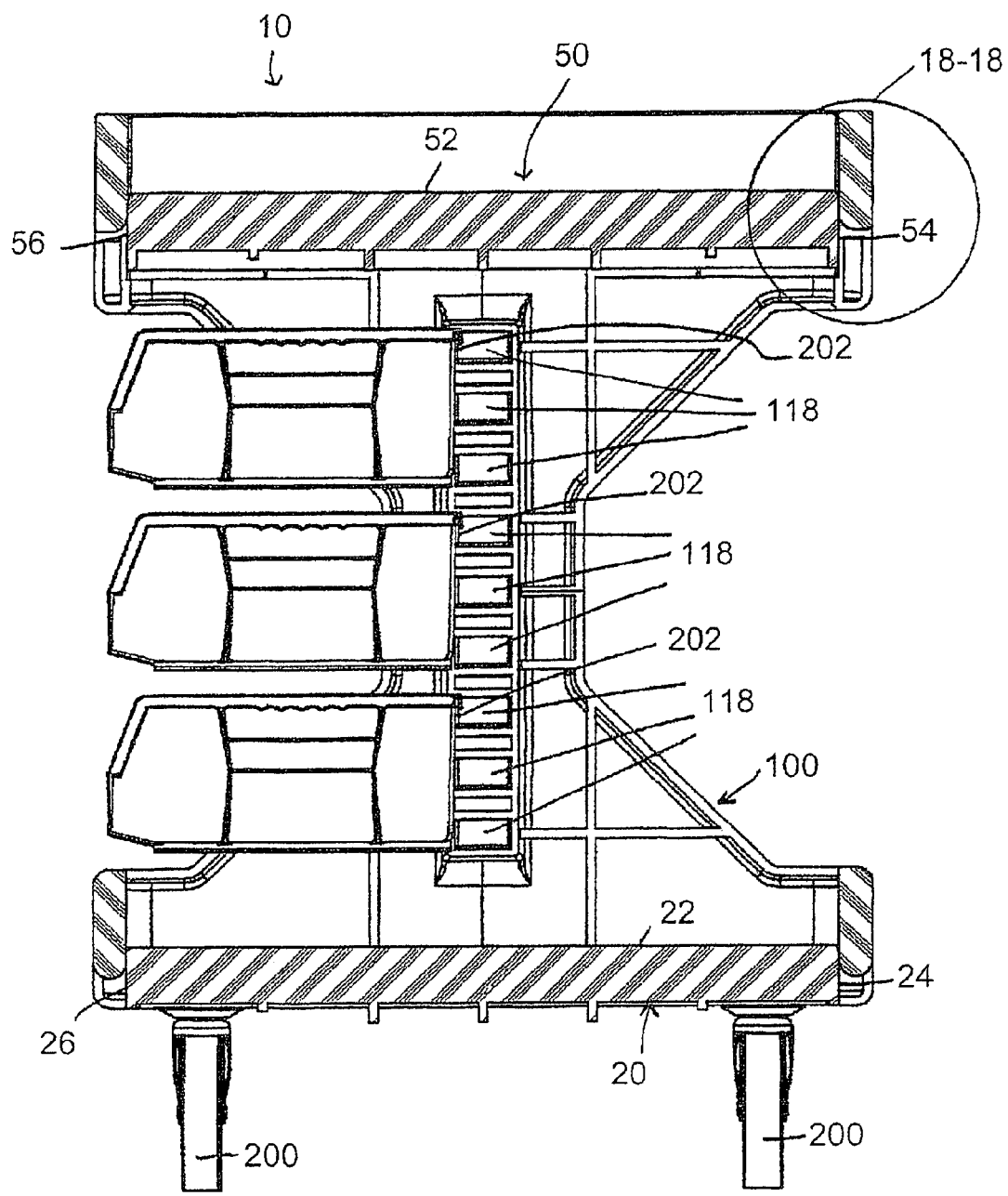
FIG. 13 is a third cross-sectional view of the utility cart in accordance with the preferred embodiment of the present invention shown in FIG. 1 in a second configuration as a bin cart, including a number of storage bins outwardly extending from one side of the utility cart, and with the panel members on the top table and the bottom table being in their upward positions to form a recessed top table and a recessed bottom table taken across line 13—13 in FIG. 12.
Figure 14:
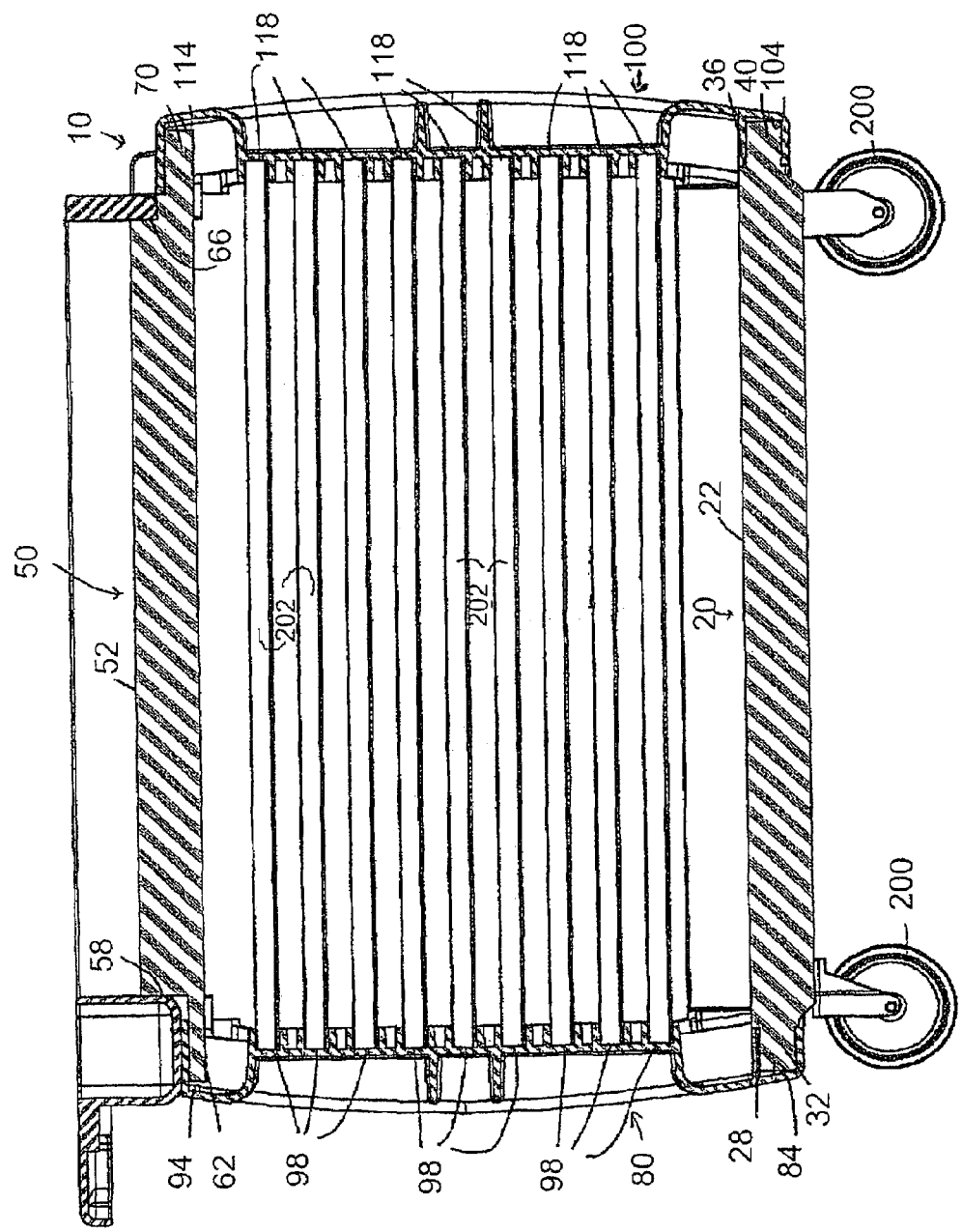
FIG. 14 is a fourth cross-sectional view of the utility cart in accordance with the preferred embodiment of the present invention shown in FIG. 1 in a second configuration as a bin cart, including a number of storage bins outwardly extending from one side of the utility cart, and with the panel members on the top table and the bottom table being in their upward positions to form a recessed top table and a recessed bottom table taken across line 14—14 in FIG. 12.
Figure 15:
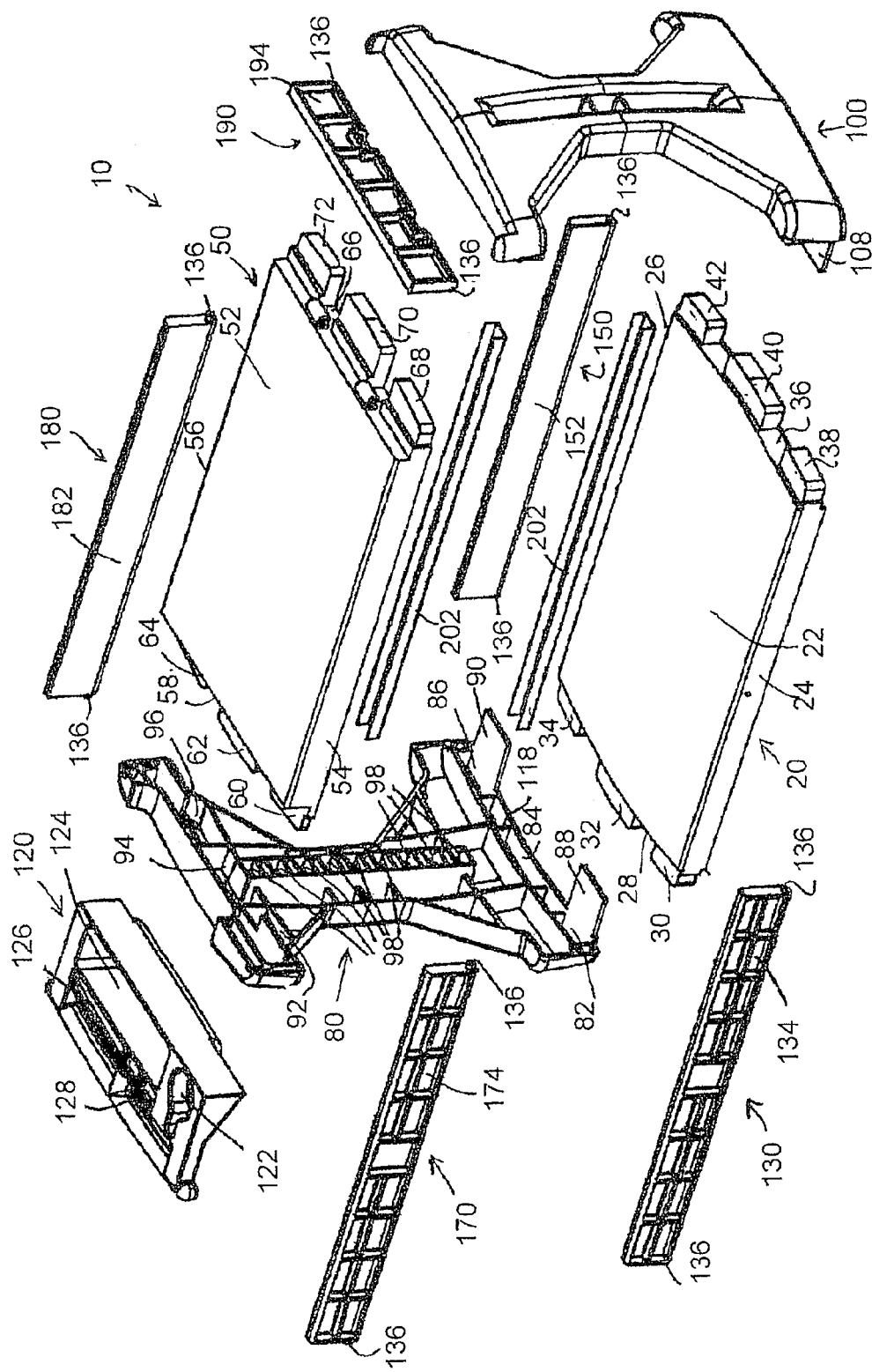
FIG. 15 is an exploded perspective view of the utility cart in accordance with the preferred embodiment of the present invention shown in FIG. 1.
Figures 16, 17:
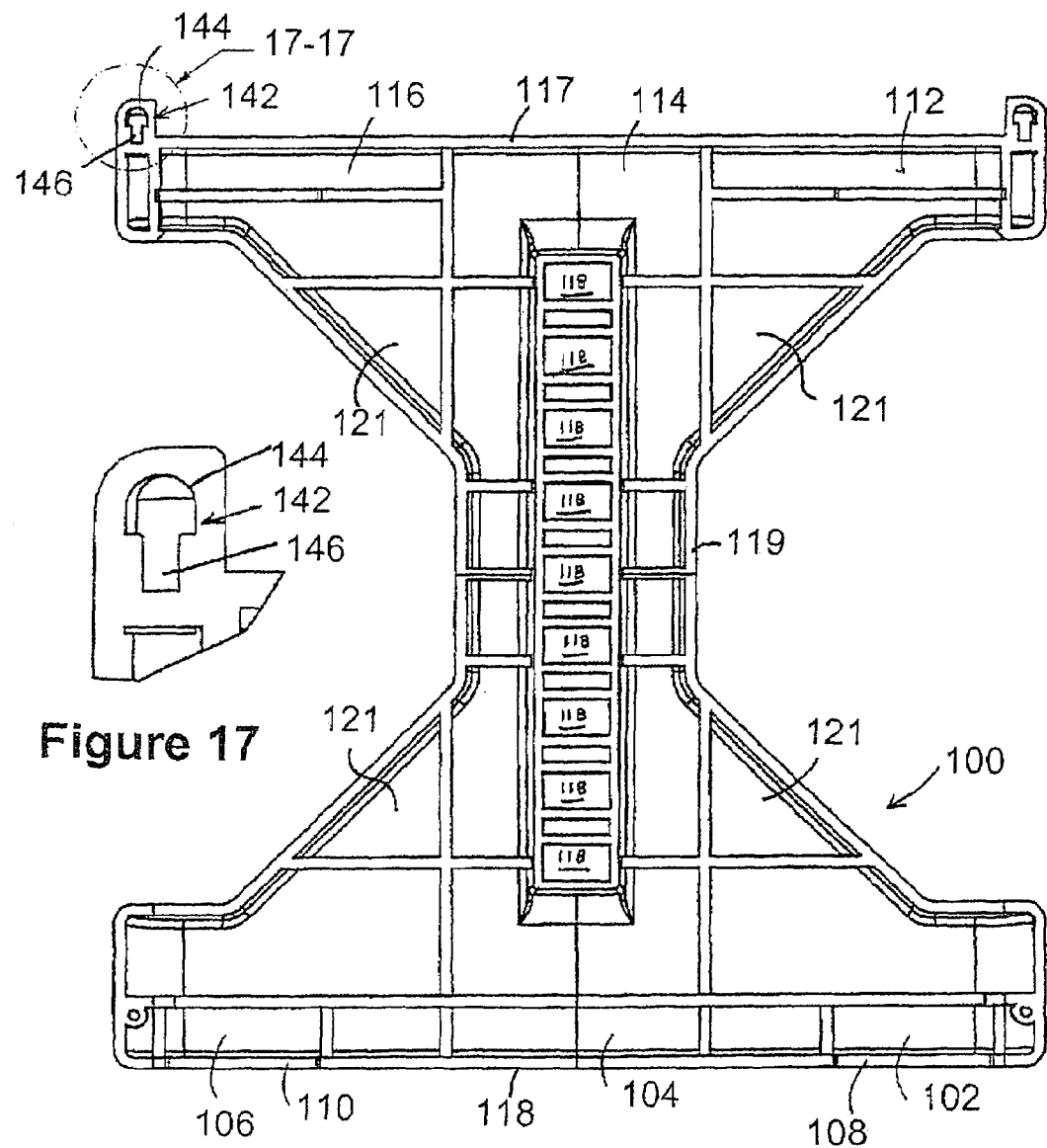
FIG. 16 is a side elevational view of a front support member used in the utility cart in accordance with the preferred embodiment of the present invention shown in FIG. 1.
FIG. 17 is a detailed view of the hinge cavity used to retain and position the panel members in the utility cart in accordance with the preferred embodiment of the present invention shown in FIG. 1 taken from circle 17—17 in FIG. 16.

In the following detailed description of a preferred embodiment of the present invention, reference is made to the accompanying drawings which, in conjunction with this detailed description, illustrate and describe a preferred embodiment of a utility cart in accordance with the present invention, generally identified by reference numeral 10. Referring now to the drawings, in which like-referenced characters indicated corresponding elements throughout the several views, attention is first directed to FIG. 1, which illustrates a first perspective view of utility cart 10 in accordance with a preferred embodiment of the present invention in a first configuration as a conventional utility cart with the area above the bottom table being open and panels members on the top table and the bottom table being in their downward positions to form a substantially flat top table and a substantially flat bottom table. Utility cart 10 generally includes bottom table 20, top table 50, rear vertical support member 80, forward vertical support member 100, handle 120 and conventional wheels 200. Referring to FIGS. 2 through 7 and 15, bottom table 20 includes first side panel member 130 and second side panel member 150 pivotally attached to the sides of bottom table 20. Similarly, top table 50 includes first side panel member 170, second side panel member 180 and forward panel member 190 pivotally attached to the sides and front of top table 50.

Bottom table 20 preferably includes substantially flat top surface 22, as well as first side surface 24 and second side surface 26 which are substantially perpendicular to substantially flat top surface 22. Rear end 28 of bottom table 20 includes at least one, and most preferably three (3), outwardly projecting tongues, first rear tongue 30, second rear tongue 32 and third rear tongue 34 which are received in corresponding first bottom table rear slot 82, second bottom table rear slot 84 and third bottom table rear slot 86, respectively, in rear vertical support member 80. Similarly, forward end 36 of bottom table 20 includes at least one, and most preferably three (3), outwardly projecting tongues, first forward tongue 38, second forward tongue 40 and third forward tongue 42, which are received in corresponding first bottom table forward slot 102, second bottom table forward slot 104 and third bottom table forward slot 106, respectively, in forward vertical support member 100. Bottom surface (not shown) of bottom table 20 could be substantially smooth, if desired, or more preferably includes a series of reinforcing ribs to strengthen bottom table 20.

Top table 50 preferably includes substantially flat top surface 52, as well as first side surface 54 and second side surface 56 which are substantially perpendicular to substantially flat top surface 52. Rear end 58 of top table 50 includes at least one, and most preferably three (3), outwardly projecting tongues, first rear tongue 60, second rear tongue 62 and third rear tongue 64, which are received in corresponding first top table rear slot 92, second top table rear slot 94 and third top table rear slot 96, respectively, in rear vertical support member 80. Similarly, forward end 66 of top table 50 includes at least one, and most preferably three (3), outwardly projecting tongues, first forward tongue 68, second forward tongue 70 and third forward tongue 72, which are received in corresponding first top table forward slot 112, second top table forward slot 114 and third top table forward slot 116, respectively, in forward vertical support member 100. Bottom surface (not shown) of top table 50 could be substantially smooth, if desired, or more preferably includes a series of reinforcing ribs to strengthen top table 50.

Rear vertical support member 80 is preferably of "I" beam type construction and includes two (2) inwardly extending projections, first bottom table projection 88 and second bottom table projection 90, which extend under, and support, bottom table 20 when utility cart 10 is assembled. More preferably, rear vertical support member 80 has a "X" type configuration to enhance its structural support capability. Rear vertical support member 80 also includes first bottom table rear slot 82, second bottom table rear lot 84, third bottom table rear lot 86, first top table rear slot 92, second top table rears lot 94 and third top table rear slot 96 which correspond to, and are received in and support, first rear tongue 30, second rear tongue 32 and third rear tongue 34 outwardly extending from rear end 28 of bottom table 20 and first rear tongue 60, second rear tongue 62 and third rear tongue 64 outwardly extending from rear end 58 of top table 50, respectively. In addition, rear vertical support member 80 includes a number of centrally positioned storage bin support rail openings 98, in the preferred embodiment of the present invention shown in the drawings nine (9) storage bin support rail openings 98, which receive and support substantially horizontal storage bin support rails 202 to which storage bins 204 are removably attached when utility cart 10 is utilized in its second configuration as a bin cart.

Forward vertical support member 100 is also preferably of "I" beam type construction and includes two (2) inwardly extending projections, first bottom table projection 108 and second bottom table projection 110 which extend under, and support, bottom table 20 when utility cart 10 is assembled. More preferably, forward vertical support member 100 has a "X" type configuration to enhance its structural support capability. Each vertical support member 80, 100 includes upper and lower cross beams, 117, 118, connected by an integral vertical support 119. Four triangular web members 121 are integrally formed between the cross beams 117, 118 and the central vertical support 119. Rear vertical support member 80 includes similar upper and lower cross beams and triangular webs. Forward vertical support member 100 also includes first bottom table forward slot 102, second bottom table forward slot 104, third bottom table forward slot 106, first top table forward slot 112, second top table forward slot 114 and third top table forward slot 116 which correspond to, and are received in and support, first forward tongue 38, second forward tongue 40 and third forward tongue 42 outwardly extending from forward end 36 of bottom table 20 and first forward tongue 68, second forward tongue 70 and third forward tongue 72 outwardly extending from forward end 66 of top table 50, respectively. In addition, forward vertical support member 100 includes a number of centrally positioned storage bin support rail openings 118, in the preferred embodiment of the present invention shown in the drawings nine (9) storage bin support rail openings 118, which receive and support substantially horizontal storage bin support rails 202 to which storage bins 204 are removably attached when utility cart 10 is utilized in its second configuration as a bin cart.

Handle 120 is attached to the outer surface of rear vertical support member 80. Handle 120 is preferably pleasing in appearance and comfortable to use and includes beverage container holder 122 which accommodates several types and sizes of beverages containers, storage tray 124 for holding various items, such as tools, liquid containers, such as cleaning bottles, gloves, rags, clipboards and the like and first storage compartment 126 and second storage compartment 128 for holding loose change, utility blades, price tags and the like.

Handle 120, pivotable forward panel member 190 in the raised position, and lower cross beams 118 form article retaining end panels extending along each end of tables 50, 20 to hold, in conjunction with side panel members 130, 150, 170, 180 in the raised position, articles on tables 50, 20.

First side panel member 130 is pivotally attached along first side surface 24 of bottom table 20 such that when first side panel member 130 is in its upright position, bottom table 20 is recessed, and when first side panel member 130 is in its downward position, bottom table 20 is substantially flat. First side panel member 130 includes first side surface 132 which is preferably substantially flat to provide a clean, smooth visual appearance when first side panel member 130 is in its downward position to form substantially flat bottom table 20. Second side surface 134 of first side panel member 130 preferably includes a series of reinforcing ribs to enhance its strength, while at the same time minimizing the weight of first side panel member 130. The series of reinforcing ribs on second side surface 134 of first side panel member 130 also provide a "rugged" visual appearance to first side panel member 130 when first side panel member 130 is in its upright position to form a recessed bottom table 20. If desired, the sides which are substantially flat and which have reinforcing ribs could be reversed, or both first side surface 132 and second side surface 134 could be made similar to each other.

Second side panel member 150 is pivotally attached along second side surface 26 of bottom table 20 such that when second side panel member 150 is in its upright position, bottom table 20 is recessed, and when second side panel member 150 is in its downward position, bottom table 20 is substantially flat. Second side panel member 150 includes first side surface 152 which is preferably substantially flat to provide a clean, smooth visual appearance when second side panel member 150 is in its downward position to form substantially flat bottom table 20. Second side surface 154 of second side panel member 150 preferably includes a series of reinforcing ribs to enhance its strength, while at the same time minimizing the weight of second side panel member 150. The series of reinforcing ribs on second side surface 154 of second side panel member 150 also provide a "rugged" visual appearance to second side panel member 150 when second side panel member 150 is in its upright position to form a recessed bottom table 20. If desired, the sides which are substantially flat and which have reinforcing ribs could be reversed, or both first side surface 152 and second side surface 154 could be made similar to each other.

First side panel member 170 is pivotally attached along first side surface 54 of top table 50 such that when first side panel member 170 is in its upright position, top table 50 is recessed, and when first side panel member 170 is in its downward position, top table 50 is substantially flat. First side panel member 170 includes first side surface 172 which is preferably substantially flat to provide a clean, smooth visual appearance when first side panel member 170 is in its downward position to form substantially flat top table 50. Second side surface 174 of first side panel member 170 preferably includes a series of reinforcing ribs to enhance its strength, while at the same time minimizing the weight of first side panel member 170. The series of reinforcing ribs on second side surface 174 of first side panel member 170 also provide a "rugged" visual appearance to first side panel member 170 when first side panel member 170 is in its upright position to form a recessed top table 50. If desired, the sides which are substantially flat and which have reinforcing ribs could be reversed, or both first side surface 172 and second side surface 174 could be made similar to each other.

Second side panel member 180 is pivotally attached along second side surface 56 of top table 50 such that when second side panel member 180 is in its upright position, top table 50 is recessed, and when second side panel member 180 is in its downward position, top table 50 is substantially flat. Second side panel member 180 includes first side surface 182 which is preferably substantially flat to provide a clean, smooth visual appearance when second side panel member 180 is in its downward position to form substantially flat top table 50. Second side surface 184 of second side panel member 180 preferably includes a series of reinforcing ribs to enhance its strength, while at the same time minimizing the weight of second side panel member 180. The series of reinforcing ribs on second size surface 184 of second side panel member 180 also provide a "rugged" visual appearance to second side panel member 180 when second side panel member 180 is in its upright position to form a recessed top table 50. If desired, the sides which are substantially flat and which have reinforcing ribs could be reversed, or both first side surface 182 and second side surface 184 could be made similar to each other.

Each side panel member 130, 150, 170, 180 has an upper surface that is flush with a top surface of an adjacent table 20, 50 when the side panel member is in its downward position.

Forward panel member 190 is pivotally attached along forward end 66 of top table 50 such that when forward panel member 190 is in its upright position, top table 50 is recessed, and when forward panel member 190 is in its downward position, top table is substantially flat. Forward panel member 190 includes first side surface 192 which is preferably substantially flat to provide a clean, smooth visual appearance when forward panel member 190 is in its downward position to form substantially flat top table 50. Second side surface 194 of forward panel member 190 preferably includes a series of reinforcing ribs to enhance its strength, while at the same time minimizing the weight of forward panel member 190. The series of reinforcing ribs on second side surface 194 of forward panel member 190 also provide a "rugged" visual appearance to forward panel member 190 when forward panel member 190 is in its upright position to form a recessed top table 50. If desired, the sides which are substantially flat and which have reinforcing ribs could be reversed, or both first side surface 192 and second side surface 194 could be made similar to each other.

Figure 18:
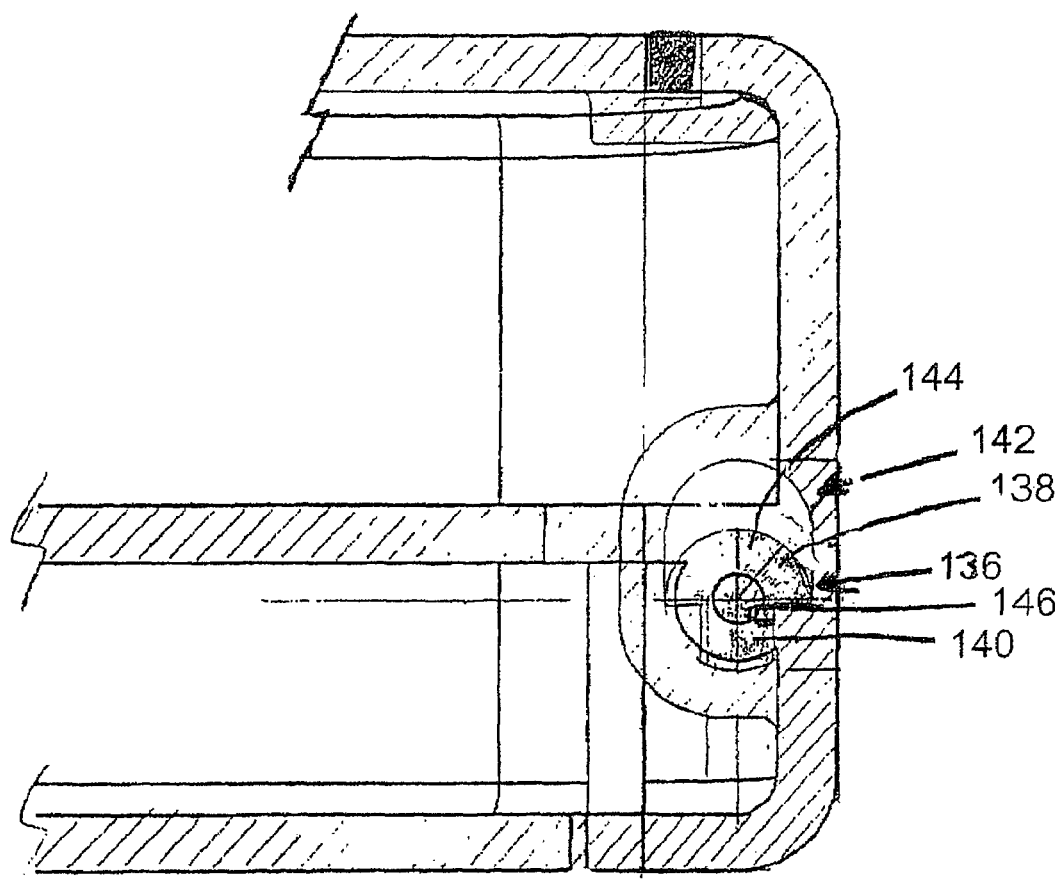
FIG. 18 is a cross-sectional view of the hinge arrangement used to retain and position the panel members in the utility cart in accordance with the preferred embodiment of the present invention shown in FIG. 1 taken from circle 18—18 in FIG. 13.
Figure 22:
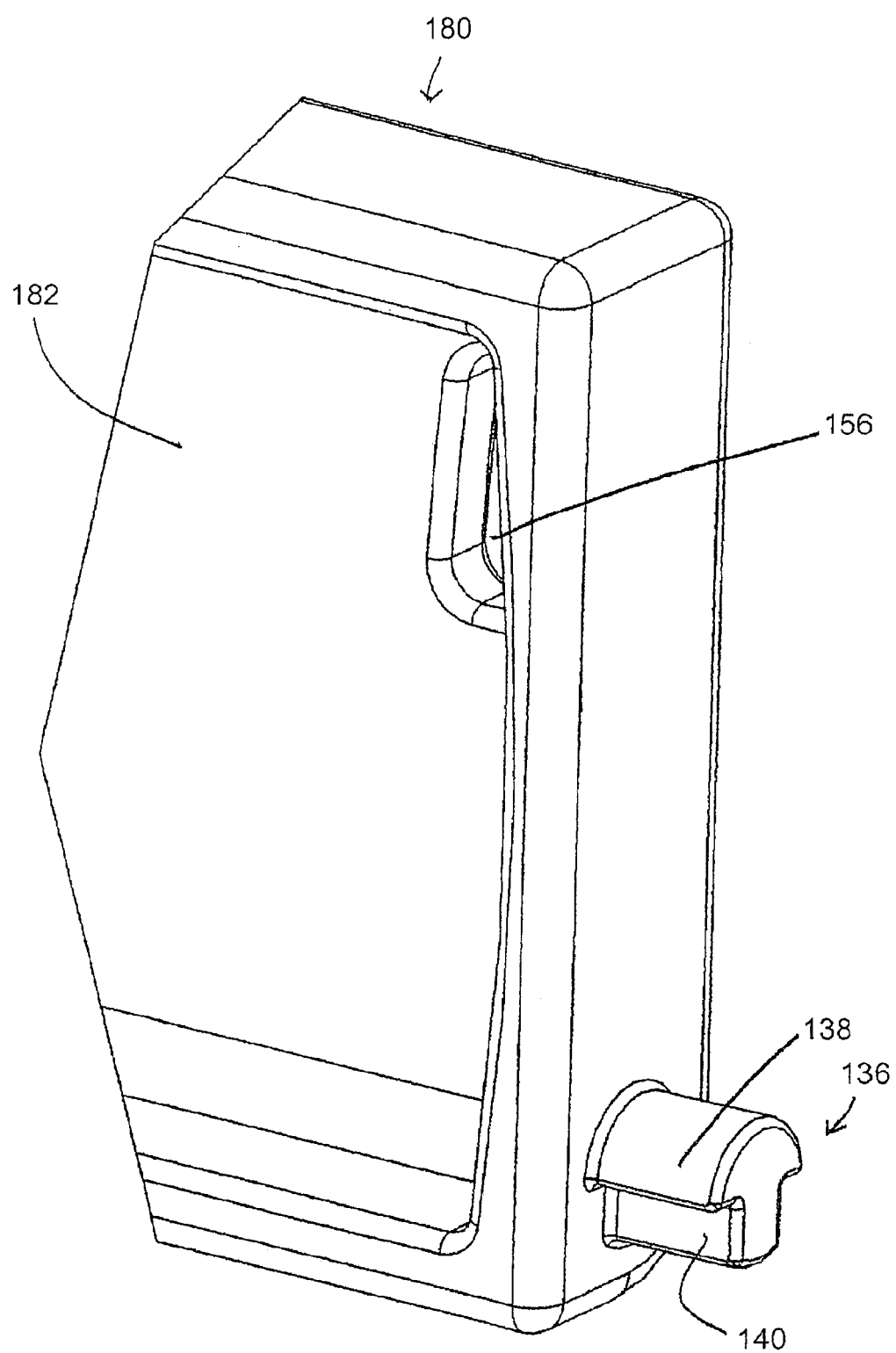
FIG. 22 is a second partial view of the second side panel member pivotally attached along the second side surface of the top table in the utility cart in accordance with the preferred embodiment of the present invention shown in FIG. 1.

Each end of first side panel member 130, second side panel member 150, first side panel member 170 and second side panel member 180 includes pin 136 outwardly extending therefrom. Referring to FIGS. 18 and 22, pin 136 generally has a "mushroom" like configuration and includes semicircular portion 138 and stem portion 140. Each pin 136 is received in a corresponding positioning cavity 142 integrally formed in one of rear vertical support member 80 and forward vertical support member 100. Positioning cavity 142 has a slightly larger "mushroom" like configuration than pin 136 and includes upwardly extended semicircular cavity 144 and stem cavity 146. Stem portion 140 of pin 136 and stem cavity 146 of positioning cavity 142 are preferably dimensioned such that stem portion 140 of pin 136 is received in stem cavity 146 of positioning cavity 142 to retain first side panel member 130, second side panel member 150, first side panel member 170 and second side panel member 180 in their upright positions to form a recessed bottom table 20 and a recessed top table 50. Semicircular portion 138 of pin 136 and upwardly extended semicircular cavity 144 of positioning cavity 142 are preferably dimensioned such that stem portion 140 of pin 136 is capable of being raised upwardly a sufficient distance to clear stem cavity 146 and permit first side panel member 130, second side panel member 150, first side panel member 170 and second side panel member 180 to be rotated downward to form a substantially flat bottom table 20 and a substantially flat top table 50. First side panel member 130, second side panel member 150, first side panel member 170 and second side panel member 180 are also capable of being rotated downward to a substantially vertical orientation when bottom table 20 and top table 50 are in their substantially flat configurations.

When side panel members 130, 150, 170, 180 are moved between the upward position and the downward position, the axis about which the side panel members pivot moves vertically.

Forward panel member 180 is pivotally attached along forward end 66 of top table 50 by a conventional hinge arrangement to permit forward panel member 180 to be rotated downward to a substantially horizontal orientation where forward panel member 180 is supported by forward vertical support member 100 to provide a substantially flat top table 50. Forward panel member 180 is also capable of being rotated upwardly to a substantially vertical orientation to provide a recessed top table 50.

The capability to quickly and easily convert bottom table 20 and/or top table 50 from a recessed configuration to a substantially flat configuration without removing any items which are present on bottom table 20 and/or top table 50 provides several advantages which are not present in known prior art utility carts. First, from a safety point of view, items can be placed onto bottom table 20 and/or top table 50 with one or more panel members in their downward position(s) by sliding the items onto a substantially flat bottom table 20 and/or a substantially flat top table 50 without lifting the items upwardly over a wall as is the case with conventional recessed table utility carts. Furthermore, when moving items, all panel members can be positioned in their upright positions to form recessed bottom table 20 and recessed top table 50 and preclude items from sliding off bottom table 20 and/or top table 50. In addition, when panel members positioned in their upright positions, the panel members and handle 120 are all at substantially the same height to permit oversize items, such as 4 foot by 8 foot pieces of plywood, to be supported by the upright panel members and handle 120 and transported using utility cart 10. Furthermore, positioning panel members in their downward positions permits bottom table 20 and top table 50 to be easily cleaned and at the same time allows utility cart 10 to be used as a recessed table utility cart if desired.

Figure 19:
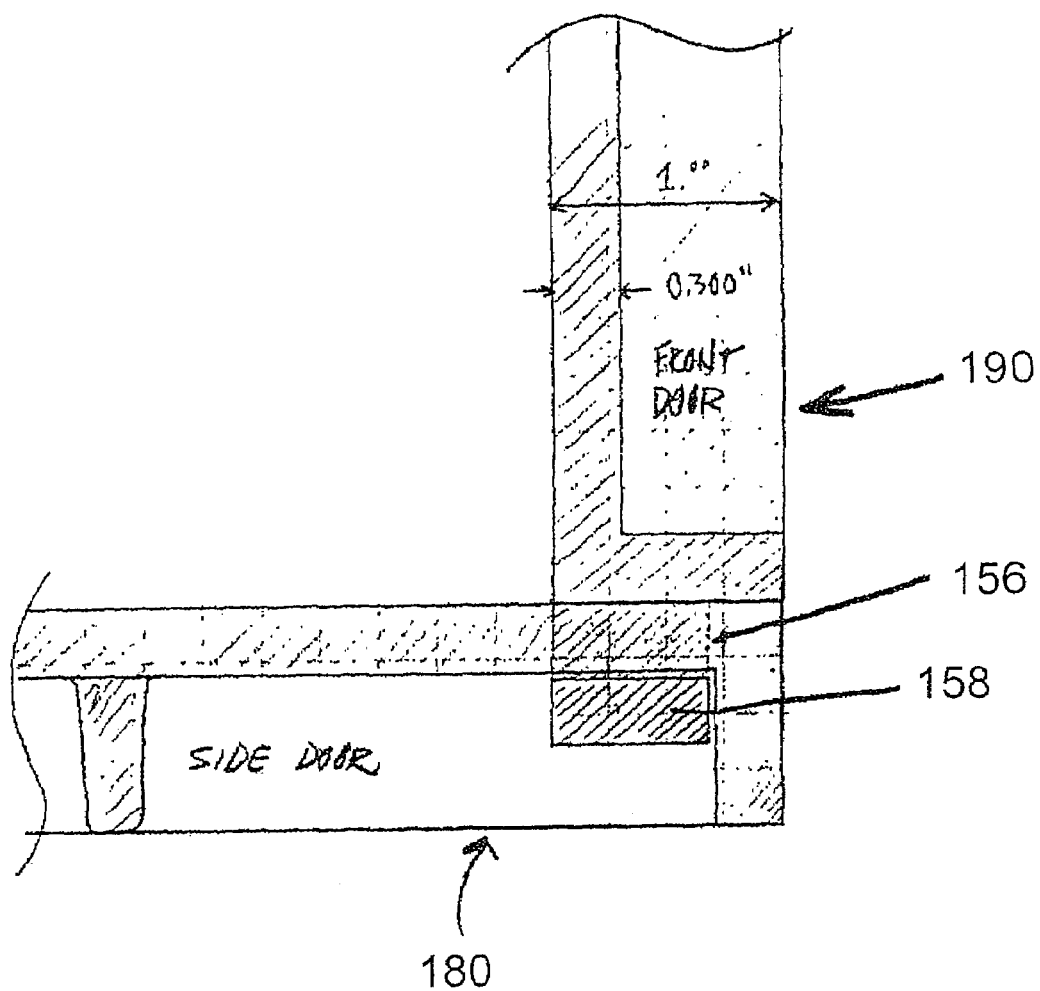
FIG. 19 is a cross-sectional view of the locking arrangement used to temporarily lock the top table panel members in the utility cart in accordance with the preferred embodiment of the present invention shown in FIG. 1.
Figure 20:
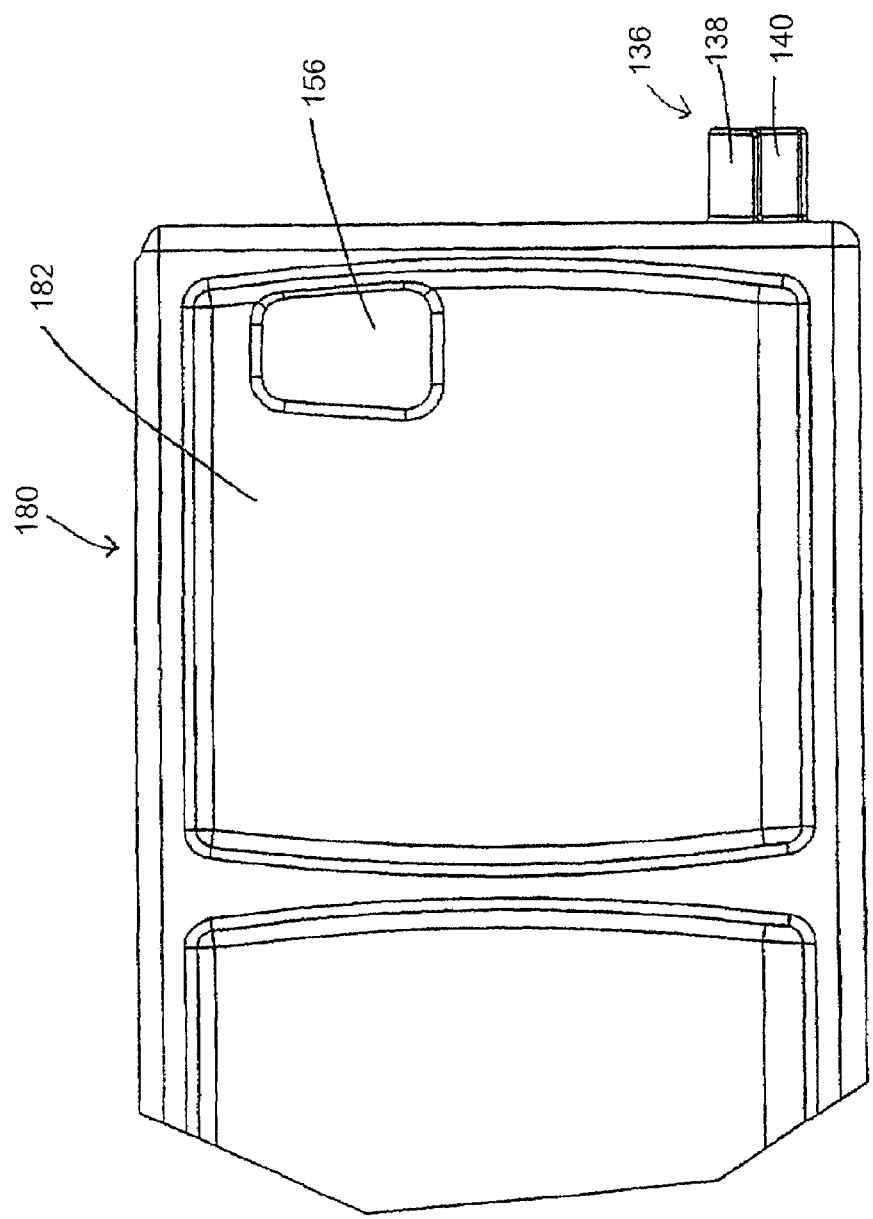
FIG. 20 is a first partial view of the second side panel member pivotally attached along the second side surface of the top table in the utility cart in accordance with the preferred embodiment of the present invention shown in FIG. 1.
Figure 21:
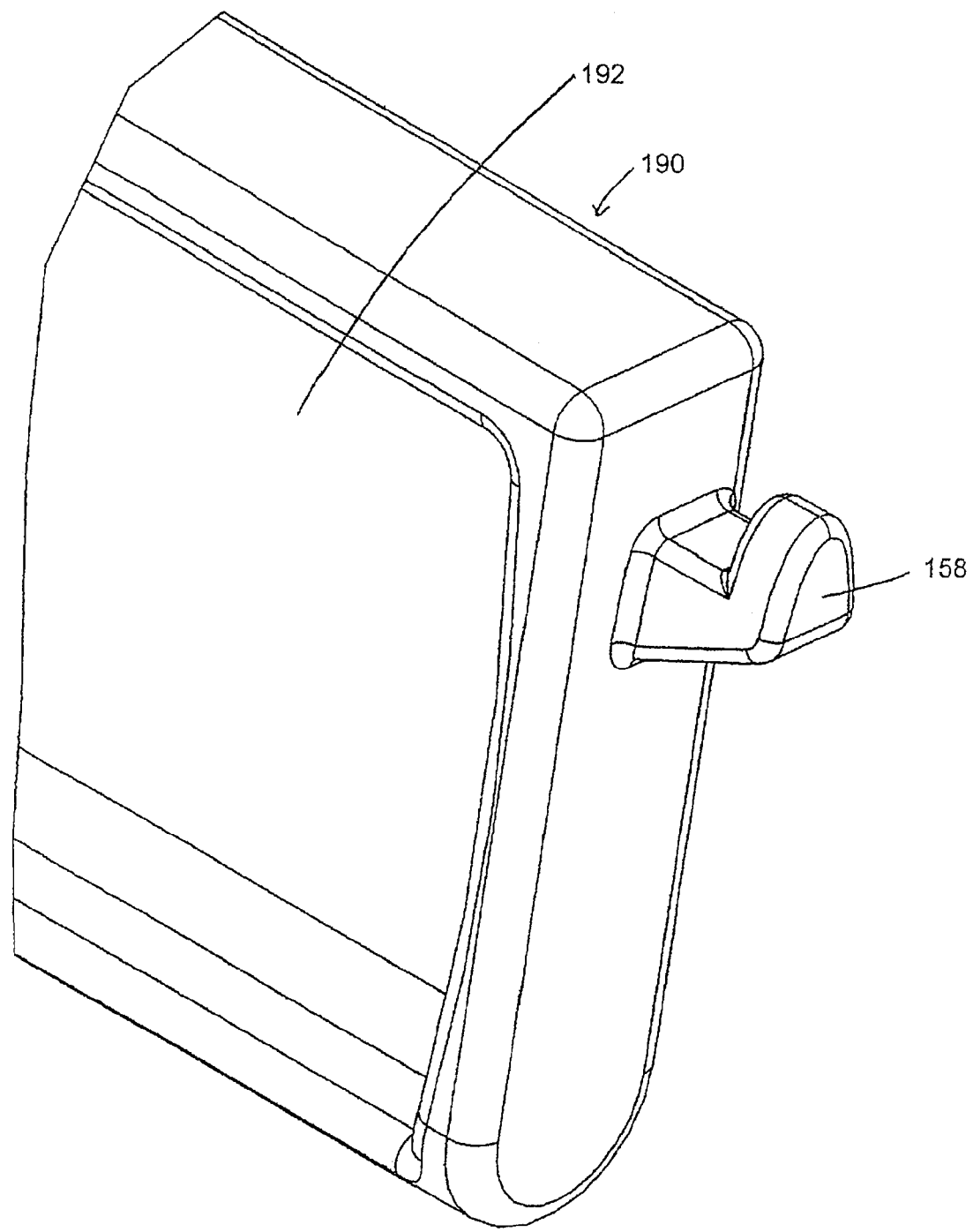
FIG. 21 is a second partial view of the forward panel member in the utility cart in accordance with the preferred embodiment of the present invention shown in FIG. 1.

The ends of first side panel member 130 and second side panel member 150 are also preferably provided with resilient projections which are resiliently compressed against rear vertical support member 80 and forward vertical support member 100 when first side panel member 130 and second side panel member 150 are in their upright positions to "lock" first side panel member 130 and second side panel member 150 in their upright positions to form a recessed bottom table 20. Similar resilient projections are preferably provided at the rear ends of first side panel member 170 and second side member 180. Referring to FIGS. 19 through 21, substantially rectangular openings 156 are provided near the forward end of first side panel member 170 and second side panel member 180. Hook members 158 outwardly extending from each end of forward panel member 190 are received in, and engage with, substantially rectangular openings 156 as shown in FIG. 19 to "lock" first side panel member 170, second side panel member 180 and forward panel member 190 together in their upright positions to form a recessed top table 50.

To convert utility cart 10 from a first configuration as a conventional utility cart, with the area above bottom table 20 open, into a second configuration as a bin cart, with a number of storage bins 204 outwardly extending therefrom, forward vertical support member 100 is removed and one or more substantially horizontal storage bin support rails 202 are positioned between corresponding storage bin support rail openings 98 in rear vertical support member 80 and storage bin support rail openings 118 in forward vertical support member 100. Storage bins 204 are then removably placed, as desired, on one or both sides of substantially horizontal storage bin support rails 202.

Conventional wheels 200 are preferably attached to the bottom of bottom table 20. If desired, one or more of conventional wheels 200 could include wheel locks to preclude rotation of the one or more conventional wheels 200 so equipped when such wheel locks are engaged.

Utility cart 10 in accordance with the preferred invention is most preferably fabricated from a high density polyethylene (HDPE) material using a structural foam process to provide a swirl finish and a walking texture that sometimes looks metallic in certain light levels. The overall dimension of utility cart 10 is, most preferably, approximately 45 inches in length, approximately 24 inches in width and approximately 34 inches in height when assembled. The preferred colors of utility cart 10 are #1 beige or #2 gray, although utility cart 10 could also be made in other dimensions and/or colors if desired. Such a utility cart 10 is capable of supporting a total load of up to 400 pounds, with bottom table 20 and top table 50 being capable of supporting up to 200 pounds each.

Although the present invention has been described above in detail, the same is by way of illustration and example only and is not to be taken as a limitation on the present invention. For example, utility carts of other sizes and configurations could be readily made by one having ordinary skill in the relevant art utilizing the teaching of the present invention. In addition, hooks, a magnetic tool retaining strip and/or other support members could be provided on the outer surfaces of one or more of back vertical support member 80 and forward vertical support member 100. Accordingly, the scope and content of the present invention are to be defined only by the terms of the appended claims.

What is claimed is:

1. A utility cart comprising:

two unitary end panels, each end panel having a plurality of cavities therein, the cavities being horizontally spaced apart;

a unitary top table positioned between the end panels;

a unitary bottom table positioned between the end panels and vertically spaced from the top table, each end of bottom table having a plurality of horizontally spaced apart tongues extending therefrom, each tongue being received in a corresponding end panel cavity; and a plurality of wheels attached to the bottom table, wherein each end panel further comprises a plurality of projections extending horizontally therefrom, each projection extending from proximate a cavity and beneath a lower surface of the bottom table.

2. A utility cart comprising:

two unitary end panels, each end panel having a plurality of cavities therein, the cavities being horizontally spaced apart;

a unitary top table positioned between the end panels;

a unitary bottom table positioned between the end panels and vertically spaced from the top table, each end of bottom table having a plurality of horizontally spaced apart tongues extending therefrom, each tongue being received in a corresponding end panel cavity; and a plurality of wheels attached to the bottom table, wherein each cavity has an upper planar portion, the top surface of the upper planar portion being co-planar with an upper surface of the bottom table.

* * * * *